July 14, 1931.     E. BISHOP     1,814,428
AIR FILTER
Filed March 29, 1930    2 Sheets-Sheet 1
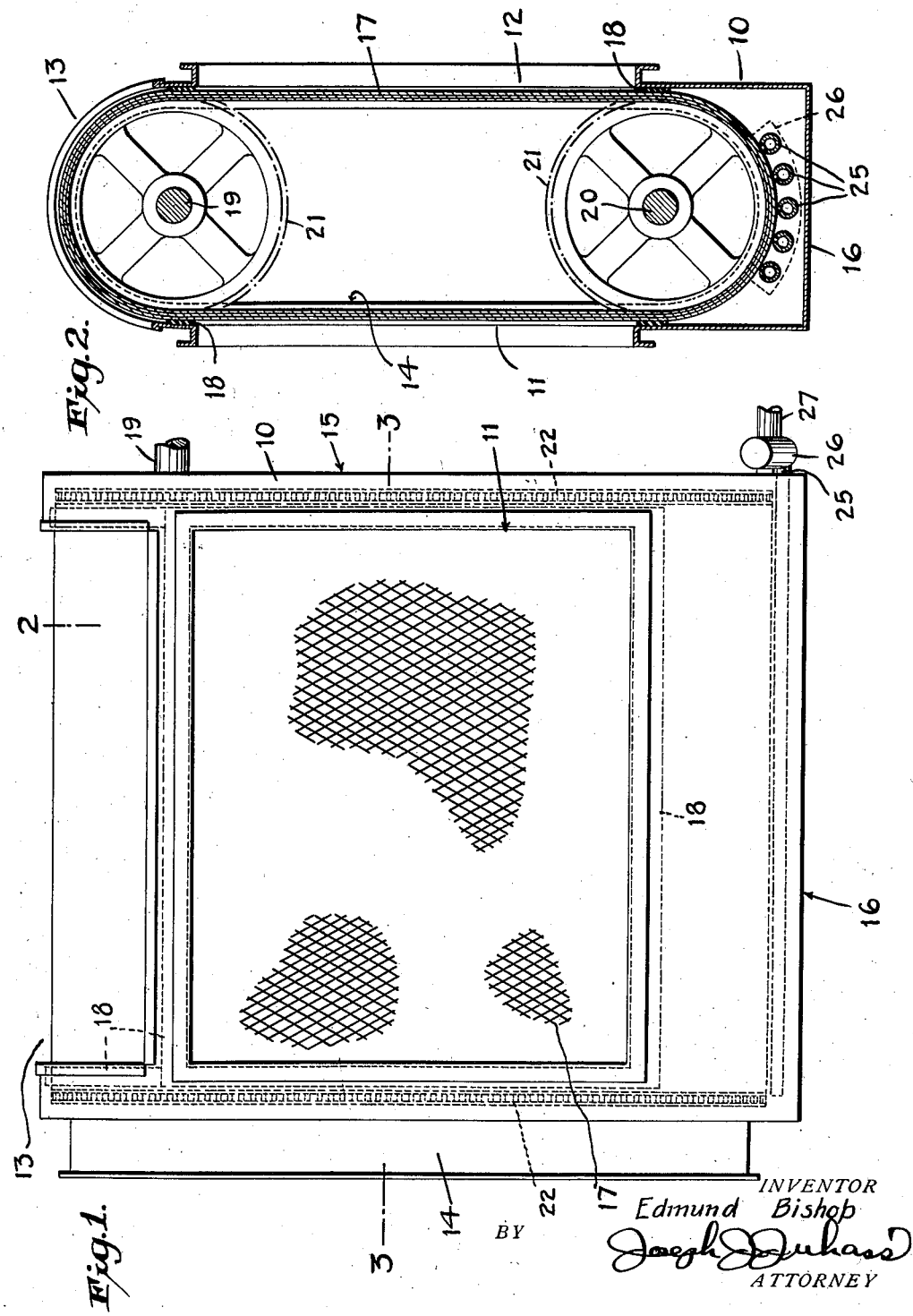
INVENTOR
Edmund Bishop
BY
ATTORNEY July 14, 1931.  E. BISHOP  1,814,428
AIR FILTER
Filed March 29, 1930  2 Sheets-Sheet 2
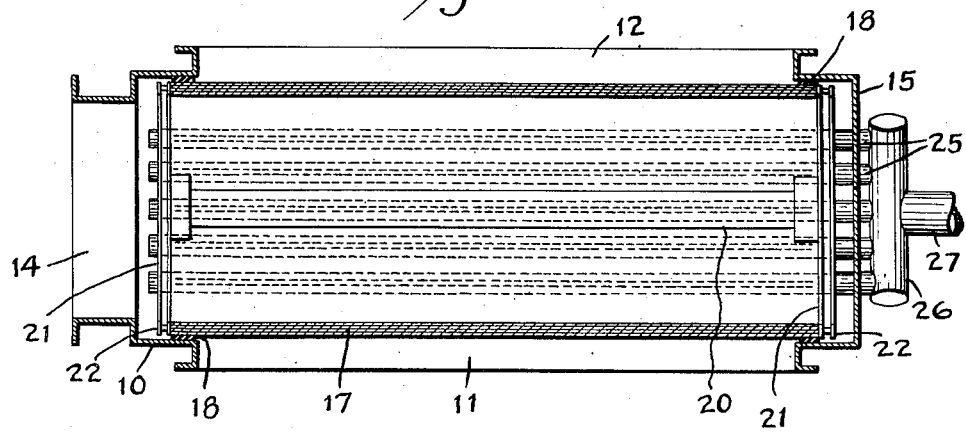
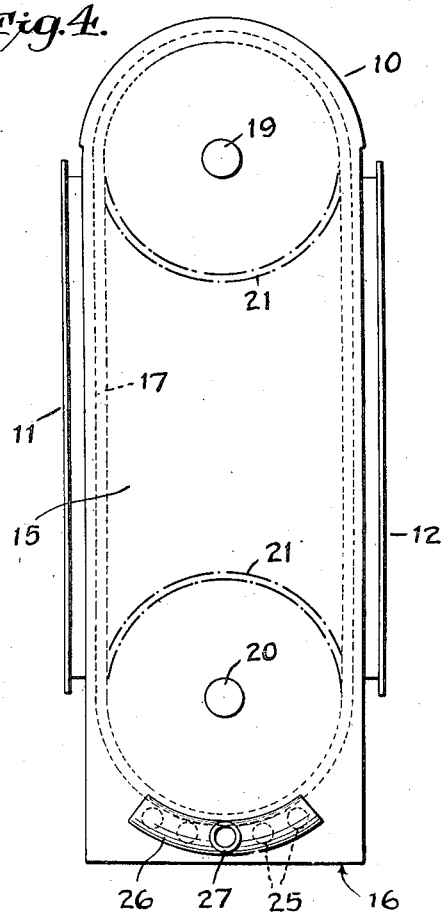
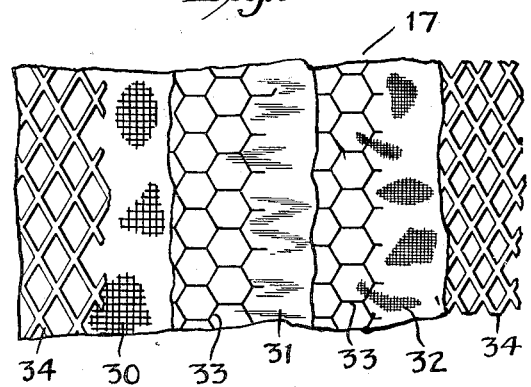
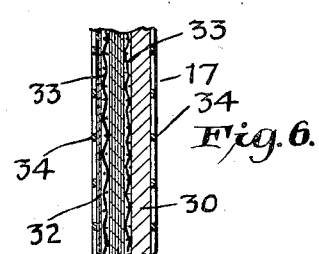
INVENTOR
Edmund Bishop
BY Joseph J Duhaas
ATTORNEY Patented July 14, 1931

1,814,428

UNITED STATES PATENT OFFICE

EDMUND BISHOP, OF NEW YORK, N. Y.

AIR FILTER

Application filed March 29, 1930. Serial No. 439,909.

The invention relates to a filter and particularly to that type of filter which is adapted to remove dust or other impurities from air.

One of the principal objects of the improved filter is to provide an air-cleaning apparatus of great efficiency, that is one in which a maximum amount of air may be cleaned or purified with a minimum amount of operating expense.

A further object is to provide a filter which may be run for great lengths of time or continuously if desired with entirely satisfactory results.

A still further object is to provide filter media which will have great lasting qualities and will not deteriorate under unfavorable atmospheric conditions.

Another object is to provide improved means for removing from the filter media all dust or other impurities that are collected thereon.

Still another object is to provide a device of this character, which is exceedingly simple and inexpensive in construction and economical in operation.

The foregoing and numerous other objects and advantages will become apparent as this specification proceeds. Referring to the drawings forming a part thereof and in which one simple embodiment of the invention is illustrated:

Figure 1 is a front elevation of the filter;

Figure 2 is a sectional view on the line 2—2 of Figure 1;

Figure 3 is a sectional plan view on the line 3—3 of Figure 1;

Figure 4 is an end-elevation looking toward the right of Figure 1;

Figure 5 is a fragmentary plan view of the filter medium, successive layers being broken away for clearness of illustration; and Figure 6 is a detail sectional view of the filter medium.

Referring again to the drawings, the reference numeral 10 designates the frame or casing for the filter. This frame or casing may vary greatly in details of construction but comprises essentially, open sides 11 and 12, an open top 13, an open end 14, a closed end 15 and a closed bottom 16.

The casing is in effect a frame in which the open sides and open top constitute a large area through which impure air may be drawn. A filter medium 17 of improved construction which will be hereinafter described passes over said open sides 11 and 12 and the open top 13. Sealing means 18 are indicated between the edges of the filter media and the casing so as to exclude all air from the casing except what is admitted through the filter media.

The filter media is preferably continuous and may be carried and rotated in the casing in any desired or suitable manner. The means illustrated only by way of example for supporting and rotating the filter media comprises shafts 19 and 20 suitably mounted in the casing. These shafts carry sprockets 21 over which sprocket chains 22 pass. The edges of the filter media are securel to the sprocket chains 22. Either of the shafts 19 or 20 may be driven from any suitable source of power. As stated, this arrangement may be widely varied:

The open sides 11 and 12 are termed the side inlets and the open top 13, the top inlet. The open end 14 is termed the outlet and the outlet is preferably connected to a blower or other suction means not thought necessary to illustrate. It is thought to be apparent from the foregoing that the maximum area of the filter is exposed to the incoming impure air, so as to provide an apparatus of great efficiency.

Novel means are provided for cleaning the filter media and collecting and removing dust or other impurities collected thereon. This means is preferably located at the lower part of the filter media and comprises a plurality of slotted pipes 25 extending across the entire filter media. These pipes are preferably connected to a manifold 26 outside of the casing. A pipe 27 connects this manifold to a suitable source of vacuum pressure for collecting and removing dust or other impurities on the filter media. Thus an effective and simple method is supplied for cleaning the filter media.

The apparatus described is extremely simple, comprising in effect only three parts, the filter media, the air tight casing and the vacuum system.

The filter media is illustrated in detail in Figures 5 and 6. It comprises a layer of loosely or coarsely woven material 30 such as burlap, asbestos or cocoa matting, a layer of paper 31, which may be from 6 to 10 ply depending upon the conditions under which the filter media is used, and a layer of cheesecloth 32. The various layers of material are separated by large mesh wire screens 33 and are confined by sheets of expanded metal 34.

In this manner an efficient and ideal dry filter is formed. The loosely woven fabric 30 removes the coarse dirt or large particles from the air and the paper 31 and cheesecloth 32 extracts all the finer particles. The vacuum system continuously cleans the filter media in an effective and efficient manner and thus a filter medium is provided which will have great lasting qualities and will not deteriorate under unfavorable atmospheric conditions. The expanded metal and wire mesh act as strengthening means and insure long life to the filter. As illustrated the filter is made of one piece. However, if desired, it may be made and probably will be in sections or panels.

Numerous changes may be made in details of construction and arrangements of parts without departing from the spirit of the invention or the scope of the appended claims.

I claim:

1. A device of the character described having in combination a substantially rectangular casing provided with air inlets at both sides, an air inlet at the top and an air outlet at one end, and a continuous filter medium adapted to pass over both of said side inlets and said top inlet.

2. A device of the character described having in combination a substantially rectangular casing provided with air inlets at both sides, an air inlet at the top, and an air outlet at one end, a continuous filter medium adapted to pass over both of said side inlets and said top inlet, and means at the lower part of said filter medium for collecting and removing dust or other impurities that are collected thereon.

3. A device of the character described having in combination a substantially rectangular casing provided with air inlets at both sides, an air inlet at the top, and an air outlet at one end, a continuous filter medium adapted to pass over both of said side inlets and said top inlet, and vacuum means at the lower part of said filter medium for collecting and removing dust or other impurities that are collected thereon.

4. A device of the character described having in combination a substantially rectangular casing provided with air inlets at both sides, an air inlet at the top, and an air outlet at one end, a continuous filter medium adapted to pass over both of said side inlets and said top inlet and a plurality of slotted pipes extending beneath the lower part of said filter medium through which vacuum pressure may be applied for collecting and removing dust or other impurities collected on said filter medium.

5. A device of the character described having in combination a substantially rectangular casing provided with air inlets at both sides, an air inlet at the top, and an air outlet at one end, a continuous filter medium adapted to pass over both of said side inlets and said top inlet, a plurality of slotted pipes extending beneath the lower part of said filter medium, and a manifold outside of said casing to which said pipes are connected and through which vacuum pressure may be supplied for collecting and removing dust or other impurities collected on said filter medium.

6. A device of the character described having in combination a casing provided with air inlets at both sides and an air outlet at one end, and a continuous filter medium adapted to pass over both of said side inlets, said filter medium comprising layers of a loosely woven fabric, paper and cheese cloth confined by sheets of expanded metal.

7. A filter medium comprising layers of a coarsely woven fabric, paper and cheese cloth confined by sheets of expanded metal.

8. A filter medium comprising a layer of a coarsely woven fabric such as burlap or similar material, a layer of paper, and a layer of cheese cloth, all of said layers being separated by a large mesh wire screen and confined by sheets of expanded metal.

9. A device of the character described, comprising in combination a substantially rectangular casing provided with air inlets at both sides, a separate auxiliary air inlet spaced from said first mentioned air inlets and located on another side of said casing, an air outlet at one end of said casing, and a continuous filter medium adapted to pass over both of said side inlets and said auxiliary inlet.

Signed at New York city, in the county of New York and State of New York this 21st day of March A. D. 1930.

EDMUND BISHOP.